(12) United States Patent  
Spitzer

(10) Patent No.: US 9,275,377 B2  
(45) Date of Patent: *Mar. 1, 2016

(54) SYSTEM, METHOD, AND COMPUTER PROGRAM PRODUCT FOR DETERMINING A MONOTONIC SET OF PRESETS

(75) Inventor: John F. Spitzer, Wimberley, TX (US)

(73) Assignee: NVIDIA Corporation, Santa Clara, CA (US)

(*) Notice: Subject to any disclaimer, the term of this patent is extended or adjusted under 35 U.S.C. 154(b) by 790 days.

This patent is subject to a terminal disclaimer.

(21) Appl. No.: 13/525,119

(22) Filed: Jun. 15, 2012

(65) Prior Publication Data

US 2013/0338966 A1    Dec. 19, 2013

(51) Int. Cl.
*G06F 15/00* (2006.01)
*G06Q 10/00* (2012.01)

(52) U.S. Cl.
CPC .............. *G06Q 10/20* (2013.01); *G06Q 10/00* (2013.01)

(58) Field of Classification Search
CPC ..... G06F 15/00; G06F 9/44505; G06Q 10/00; G06Q 10/20; A63F 13/00; A63F 13/323
USPC ......................................................... 702/182
See application file for complete search history.

(56) References Cited

U.S. PATENT DOCUMENTS

| | | |
|---|---|---|
| 3,688,278 A | 8/1972 | Sauvan et al. |
| 5,086,386 A | 2/1992 | Islam |
| 5,671,351 A | 9/1997 | Wild et al. |
| 5,958,058 A | 9/1999 | Barrus |
| 5,987,624 A | 11/1999 | Eglit |
| 6,044,476 A | 3/2000 | Ote et al. |
| 6,059,842 A * | 5/2000 | Dumarot et al. ............... 717/153 |
| 6,314,479 B1 | 11/2001 | Frederick et al. |
| 6,646,653 B2 | 11/2003 | San et al. |
| 6,654,952 B1 | 11/2003 | Nair et al. |
| 6,753,881 B1 | 6/2004 | Callway et al. |
| 6,768,519 B2 | 7/2004 | Fujita et al. |
| 6,847,358 B1 | 1/2005 | Ford et al. |
| 6,850,973 B1 | 2/2005 | Larson et al. |
| 6,901,580 B2 | 5/2005 | Iwanojko et al. |
| 7,034,828 B1 | 4/2006 | Drebin et al. |
| 7,080,247 B2 | 7/2006 | Rochford, II et al. |
| 7,243,371 B1 | 7/2007 | Kasper et al. |
| 7,293,201 B2 | 11/2007 | Ansari |
| 7,299,382 B2 | 11/2007 | Jorapur |

(Continued)

FOREIGN PATENT DOCUMENTS

| | | |
|---|---|---|
| CN | 1752952 A | 3/2006 |
| CN | 101303672 A | 11/2008 |

(Continued)

OTHER PUBLICATIONS

Hellerstein, J., Optimizing Software Packages for Application Management, 2008 IEEE, 8 pp.*

(Continued)

*Primary Examiner* — Toan Le
(74) *Attorney, Agent, or Firm* — Zilka-Kotab, PC

(57) ABSTRACT

A system, method, and computer program product are provided for determining a monotonic set of presets. In use, a plurality of parameters associated with a product or service is identified. Additionally, a monotonic set of presets associated with the product or service are determined, based on the plurality of parameters.

13 Claims, 3 Drawing Sheets

(56) References Cited

U.S. PATENT DOCUMENTS

| | | |
|---|---|---|
| 7,603,445 B1 | 10/2009 | Fehrle |
| 7,626,944 B1 | 12/2009 | Riddle |
| 7,659,897 B1* | 2/2010 | Azar .......................... 345/501 |
| 7,778,936 B2 | 8/2010 | Adhikari |
| 8,171,342 B2 | 5/2012 | Wu |
| 8,276,133 B1 | 9/2012 | Lebaredian et al. |
| 8,280,864 B1 | 10/2012 | Herz et al. |
| 8,296,781 B1 | 10/2012 | Lebaredian et al. |
| 9,092,573 B2 | 7/2015 | Spitzer et al. |
| 2001/0008021 A1 | 7/2001 | Ote et al. |
| 2002/0073415 A1 | 6/2002 | Kim et al. |
| 2002/0083228 A1 | 6/2002 | Chiloyan et al. |
| 2002/0095501 A1 | 7/2002 | Chiloyan et al. |
| 2003/0023841 A1 | 1/2003 | Atherton et al. |
| 2003/0033519 A1 | 2/2003 | Buckman et al. |
| 2003/0055930 A1 | 3/2003 | Haneda |
| 2003/0140333 A1 | 7/2003 | Odaka et al. |
| 2003/0225917 A1 | 12/2003 | Partamian et al. |
| 2004/0187103 A1 | 9/2004 | Wickham et al. |
| 2004/0199615 A1 | 10/2004 | Philyaw |
| 2004/0212610 A1 | 10/2004 | Hamlin |
| 2004/0249618 A1 | 12/2004 | Fine et al. |
| 2005/0076002 A1 | 4/2005 | Williams et al. |
| 2005/0104888 A1 | 5/2005 | Ford et al. |
| 2005/0120208 A1 | 6/2005 | Dobson |
| 2005/0133067 A1 | 6/2005 | Bergman |
| 2005/0225639 A1 | 10/2005 | Somers |
| 2006/0112057 A1 | 5/2006 | Lai |
| 2006/0132473 A1 | 6/2006 | Fuller et al. |
| 2006/0188174 A1 | 8/2006 | Minadakis |
| 2007/0002347 A1 | 1/2007 | Lai et al. |
| 2007/0055153 A1 | 3/2007 | Simopoulos et al. |
| 2007/0066403 A1 | 3/2007 | Conkwright |
| 2007/0098288 A1 | 5/2007 | Raskar et al. |
| 2007/0172140 A1 | 7/2007 | Kokemohr |
| 2007/0268204 A1 | 11/2007 | Kawabe |
| 2007/0277134 A1 | 11/2007 | Zhang et al. |
| 2007/0300203 A1 | 12/2007 | Jeong et al. |
| 2008/0005611 A1 | 1/2008 | Solyanik |
| 2008/0040732 A1 | 2/2008 | Akiyama et al. |
| 2008/0072077 A1 | 3/2008 | Orr |
| 2008/0102957 A1 | 5/2008 | Burman et al. |
| 2008/0133067 A1 | 6/2008 | DeMay |
| 2008/0242423 A1 | 10/2008 | Kerr et al. |
| 2008/0270569 A1 | 10/2008 | McBride et al. |
| 2009/0011835 A1 | 1/2009 | Hansen et al. |
| 2009/0057395 A1 | 3/2009 | He et al. |
| 2009/0064053 A1 | 3/2009 | Crawford et al. |
| 2009/0069084 A1 | 3/2009 | Reece et al. |
| 2009/0094076 A1 | 4/2009 | Reddy |
| 2009/0115778 A1 | 5/2009 | Ford et al. |
| 2010/0162201 A1 | 6/2010 | Shnaiderman et al. |
| 2010/0269137 A1 | 10/2010 | Nakajima et al. |
| 2010/0318855 A1 | 12/2010 | Beg et al. |
| 2012/0155475 A1 | 6/2012 | Vasseur et al. |
| 2012/0272220 A1 | 10/2012 | Calcagno et al. |
| 2014/0009470 A1 | 1/2014 | Spitzer et al. |
| 2014/0011581 A1 | 1/2014 | Spitzer et al. |
| 2014/0012532 A1 | 1/2014 | Spitzer et al. |
| 2014/0013094 A1* | 1/2014 | Spitzer et al. ..................... 713/2 |
| 2014/0013159 A1 | 1/2014 | Spitzer et al. |
| 2014/0013303 A1 | 1/2014 | Spitzer |

FOREIGN PATENT DOCUMENTS

| | | |
|---|---|---|
| TW | 413798 B | 12/2000 |
| TW | 201205427 A | 2/2012 |

OTHER PUBLICATIONS

Advisory Action from U.S. Appl. No. 12/001,669, dated Oct. 14, 2011.
Final Office Action from U.S. Appl. No. 12/001,669, dated Jul. 21, 2011.
Notice of Allowance from U.S. Appl. No. 12/001,669, dated Aug. 31, 2012.
Non-Final Office Action from U.S. Appl. No. 12/001,669, dated Feb. 17, 2011.
Non-Final Office Action from U.S. Appl. No. 12/001,669, dated May 11, 2012.
Final Office Action from U.S. Appl. No. 12/001,504, dated Feb. 7, 2012.
Notice of Allowance from U.S. Appl. No. 12/001,504, dated Jun. 7, 2012.
Non-Final Office Action from U.S. Appl. No. 12/001,504, dated Aug. 5, 2011.
Advisory Action from U.S. Appl. No. 11/958,266, dated Feb. 22, 2012.
Final Office Action from U.S. Appl. No. 11/958,266, dated Oct. 19, 2010.
Final Office Action from U.S. Appl. No. 11/958,266, dated Dec. 12, 2011.
Notice of Allowance from U.S. Appl. No. 11/958,266, dated Jul. 2, 2012.
Non-Final Office Action from U.S. Appl. No. 11/958,266, dated Feb. 23, 2010.
Non-Final Office Action from U.S. Appl. No. 11/958,266, dated Jun. 21, 2011.
Non-Final Office Action from U.S. Appl. No. 12/352,268, dated Feb. 10, 2012.
Ribeiro-Filho, J. L. et al., "GAME: A Framework for Programming Genetic Algorithms Applications," IEEE, 1994, pp. 840-845.
U.S. Appl. No. 13/543,184, filed Jul. 6, 2012.
U.S. Appl. No. 13/543,212, filed Jul. 6, 2012.
U.S. Appl. No. 13/543,196, filed Jul. 6, 2012.
U.S. Appl. No. 13/543,228, filed Jul. 6, 2012.
U.S. Appl. No. 13/543,242, filed Jul. 6, 2012.
U.S. Appl. No. 12/352,268, filed Jan. 12, 2009.
Non-Final Office Action from U.S. Appl. No. 13/543,242, dated Oct. 6, 2014.
Final Office Action from U.S. Appl. No. 12/352,268, dated Jan. 28, 2015.
Office Action from Taiwan Patent Application No. 102123499, dated Nov. 25, 2014.
Non-Final Office Action from U.S. Appl. No. 13/543,212, dated Nov. 5, 2014.
Office Action from Taiwan Patent Application No. 102123862, dated Dec. 25, 2014.
Office Action from Taiwan Patent Application No. 102123858, dated Dec. 1, 2014.
Final Office Action from U.S. Appl. No. 13/543,184, dated Dec. 3, 2014.
Advisory Action from U.S. Appl. No. 13/543,184, dated Feb. 12, 2015.
Office Action from Taiwan Patent Application No. 102123502, dated Jan. 21, 2015.
Unigraphics Basics, Nov. 14, 2004, retrieved from https://web.archive.org/web/20041114135544/http://homepages.cae.wisc.edu/~me232/ug/ug_basic.html.
Schmid, P., "Game Over? Core 2 Duo Knocks Out Athlon 64," Jul. 14, 2006, retrieved from http://www.tomshardware.com/reviews/core2-duo-knocks-athlon-64,1282-11.html.
Final Office Action from U.S. Appl. No. 12/352,268, dated Jan. 16, 2014.
Final Office Action from U.S. Appl. No. 12/352,268, dated Dec. 21, 2012.
Non-Final Office Action from U.S. Appl. No. 12/352,268, dated Jun. 19, 2014.
Non-Final Office Action from U.S. Appl. No. 12/352,268, dated Jun. 24, 2013.
Non-Final Office Action from U.S. Appl. No. 13/543,228, dated Jun. 13, 2014.
Nyanchama, M. et al., "The Role Graph Model and Conflict of Interest", Feb. 1999, pp. 3-33.
Notice of Allowance from U.S. Appl. No. 13/543,228, dated Nov. 21, 2014.

(56) References Cited

OTHER PUBLICATIONS

Non-Final Office Action from U.S. Appl. No. 13/543,184, dated Jul. 22, 2014.
Notice of Allowance from U.S. Appl. No. 13/543,228, dated Mar. 17, 2015.
Final Office Action from U.S. Appl. No. 13/543,212, dated Mar. 18, 2015.
Non-Final Office Action from U.S. Appl. No. 13/543,196, dated Mar. 18, 2015.
Office Action from Taiwan Patent Application No. 102123858, dated Mar. 13, 2015.
Notice of Allowance from Taiwan Patent Application No. 102123862, dated Apr. 22, 2015.
Final Office Action from U.S. Appl. No. 13/543,242, dated May 15, 2015.
Notice of Allowance from U.S. Appl. No. 13/543,212, dated Jun. 8, 2015.
Office Action from Taiwan Patent Application No. 102123504, dated Jun. 22, 2015.
Notice of Allowance from U.S. Appl. No. 13/543,184, dated Jul. 27, 2015.
Final Office Action from U.S. Appl. No. 13/543,196, dated Jul. 17, 2015.
Advisory Action from U.S. Appl. No. 13/543,196, dated Sep. 16, 2015.
Notice of Allowance from U.S. Appl. No. 13/543,212, dated Sep. 29, 2015.
Notice of Allowance from U.S. Appl. No. 13/543,242, dated Sep. 16, 2015.
Office Action from Chinese Patent Application No. 201310284846.8, dated Sep. 30, 2015.

\* cited by examiner

SYSTEM, METHOD, AND COMPUTER PROGRAM PRODUCT FOR DETERMINING A MONOTONIC SET OF PRESETS

FIELD OF THE INVENTION

The present invention relates to parameter analysis, and more particularly to determining a set of presets based on parameter analysis.

BACKGROUND

Many products in existence today include one or more parameters that influence an overall experience associated with the product. For example, computer games and other software may have many parameters that determine a quality of rendering, audio, game play, etc. However, current techniques for arranging the parameters associated with these products have been associated with various limitations.

For example, currently, customers may be responsible for manually adjusting a plurality of parameters associated with a product in order to determine appropriate settings for that product. This may result in less than optimal settings for the product, time-consuming trial and error by the customer, etc. There is thus a need for addressing these and/or other issues associated with the prior art.

SUMMARY

A system, method, and computer program product are provided for determining a monotonic set of presets. In use, a plurality of parameters associated with a product or service is identified. Additionally, a monotonic set of presets associated with the product or service are determined, based on the plurality of parameters.

DETAILED DESCRIPTION

Figure 1:
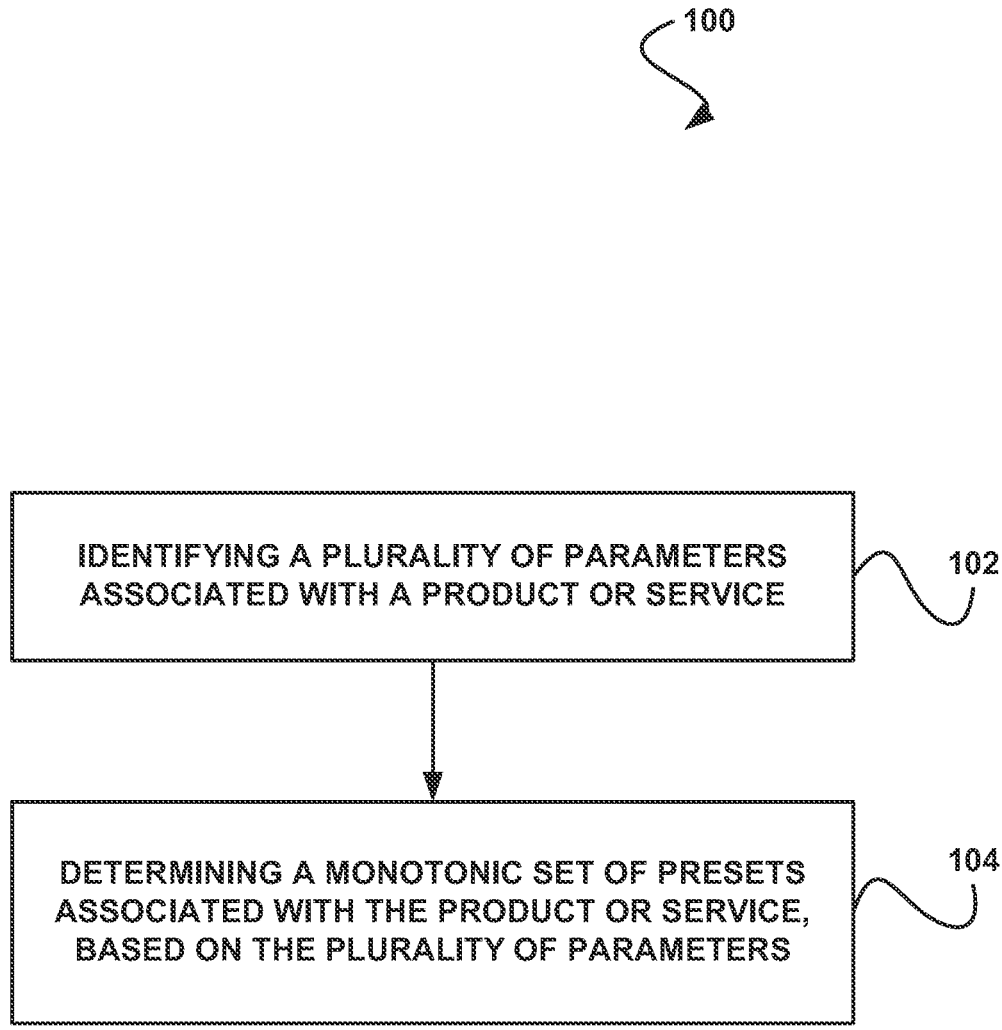
FIG. 1 shows a method for determining a monotonic set of presets, in accordance with one embodiment.

FIG. 1 shows a method 100 for determining a monotonic set of presets, in accordance with one embodiment. As shown in operation 102, a plurality of parameters associated with a product or service is identified. In one embodiment, the product or service may include any object or procedure that has a plurality of parameters associated with it. For example, the product or service may include an object such as a personal computer or other hardware element, an automobile, a house, etc. In another example, the product or service may include a procedure such as a delivery process, a building process, a cleaning process, etc.

Additionally, in one embodiment, the plurality of parameters may include any characteristics of the product or service. For example, the plurality of elements may include hardware (e.g., a central processing unit (CPU), a graphics processing unit (GPU), random access memory (RAM), a motherboard, a display, etc.) installed within a personal computer (e.g., a desktop computer, laptop computer, tablet computer, personal digital assistant, cellular telephone, etc.), software (e.g., an operating system, drivers, etc.) installed within a personal computer, engine characteristics of an automobile (e.g., timing, header type, etc.), etc. In another example, the plurality of elements may include staff that implements a procedure, resources used within a procedure, a schedule used to implement a procedure, etc.

Further, in one embodiment, one or more of the plurality of parameters may be independently configurable. For example, each of the plurality of parameters may be able to be altered independently from the other parameters. In another embodiment, each of the plurality of parameters may be utilized by the product or service to perform one or more actions. In yet another embodiment, the plurality of parameters may be identified at a server. For example, the plurality of parameters may be sent from the product or service or an entity associated with the product or service to a server via a network (e.g., a wireless network, a wired network, a cellular network, a satellite network, etc.).

Additionally, as shown in operation 104, a monotonic set of presets associated with the product or service are determined, based on the plurality of parameters. In one embodiment, each preset of the monotonic set of presets may include predefined settings for one or more of the plurality of parameters associated with the product or service. For example, the product or service may include a personal computer, and each preset of the monotonic set of presets may include predefined settings for one or more elements of hardware and software installed within the personal computer.

Further, in another example, the product or service may include an automobile, and each preset of the monotonic set of presets may include predefined settings for one or more engine components installed within the automobile. In another embodiment, the monotonic set of presets may be associated with one or more operations being performed by the product or service. For example, the monotonic set of presets may include predefined settings for running a particular software program by a personal computer. In another example, the monotonic set of presets may include predefined settings for running an automobile in a particular setting (e.g. a sports setting, a fuel economy setting, etc.).

Further still, in one embodiment, the monotonic set of presets may include an ordered list of presets. In another embodiment, the monotonic set of presets may include a set of presets that sequentially increases with respect to a first characteristic and sequentially decreases with respect to a second characteristic. For example, the monotonic set of presets may be ordered, and each successive preset within the set of presets may have an improved first characteristic and a decreased second characteristic when compared to the previous preset within the set of presets. In yet another embodiment, the first characteristic may be associated with quality (e.g., image quality, sound quality, experience quality, etc.), and the second characteristic may be associated with performance (e.g., speed, economy, efficiency, etc.).

For example, the product or service may include a software program that is run on a personal computer, and each successive preset within the set of presets may have an improved image quality of the software program and a decreased performance of the software program. In another example, the product or service may include performance programming that is run within an automobile, and each successive preset within the set of presets may have an improved performance of the automobile and a decreased gas mileage of the automobile.

Also, in one embodiment, the monotonic set of presets may be determined utilizing an algorithm. For example, the monotonic set of presets may be determined utilizing a greedy algorithm, an exhaustive algorithm, etc. In another embodiment, the monotonic set of presets may be determined by maximizing a first characteristic with respect to a second characteristic for each preset of the set of presets. For example, each preset of the set of presets may have a first characteristic associated with quality and a second characteristic associated with performance, and the first characteristic may be optimized with respect to the second characteristic.

In addition, in one embodiment, the plurality of parameters may be used to optimize the first characteristic of each preset with respect to the second characteristic. For example, for each preset, the settings for one or more of the plurality of parameters may be manipulated (e.g., turned on or off, increased, reduced, etc.) to determine the greatest possible magnitude of the first characteristic with respect to the second characteristic. In another embodiment, each preset may include the settings for the plurality of parameters that yield the greatest possible magnitude of the first characteristic with respect to the second characteristic.

Furthermore, in one embodiment, the monotonic set of presets associated with the product or service may be sent to the product or service. For example, the monotonic set of presets associated with a personal computer may be determined at a server and may be sent to the personal computer via a network. In this way, the monotonic set of presets may provide a variety of structured settings optimized for the product or service.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
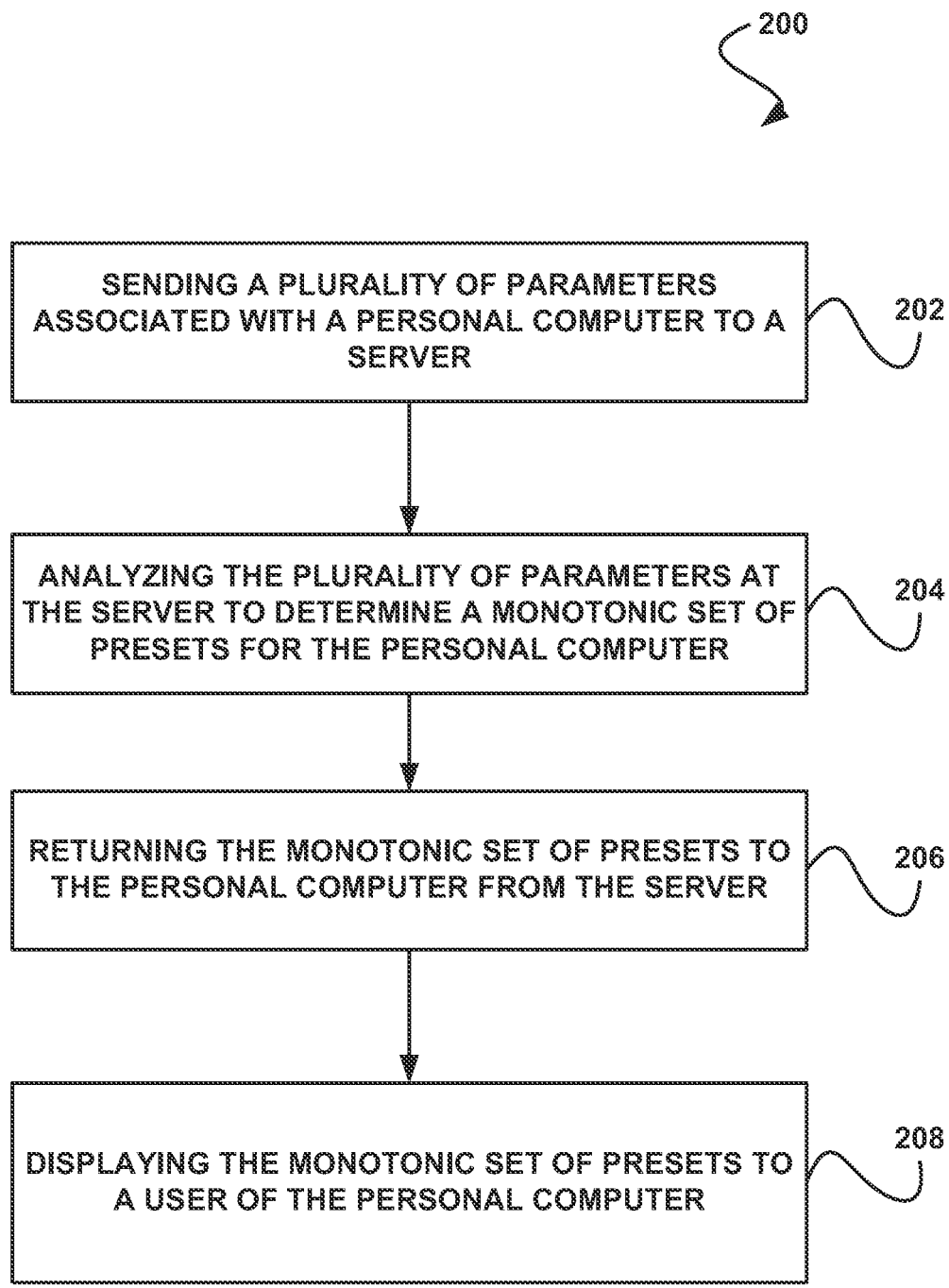
FIG. 2 shows a method for determining a monotonic set of presets for a personal computer, in accordance with another embodiment.

FIG. 2 shows a method 200 for determining a monotonic set of presets for a personal computer, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a plurality of parameters associated with a personal computer is sent to a server. In one embodiment, the plurality of parameters may include parameters associated with a display of the personal computer. For example, the plurality of parameters may include a screen resolution of the personal computer. In another embodiment, the plurality of parameters may include parameters associated with the rendering of graphics by the personal computer. For example, the plurality of parameters may include specifics of system hardware installed within the personal computer (e.g., CPU specifics, GPU specifics, motherboard specifics, RAM specifics, etc.), specifics of system software installed within the personal computer, etc.

Additionally, in one embodiment, the server may be remote from the personal computer, and the plurality of parameters may be sent to the server over a network. For example, software installed within the personal computer may obtain the plurality of parameters and may send such parameters to the server. In another embodiment, the server may be located within the personal computer, and the plurality of parameters may be sent to the server within the personal computer. Of course, however, the plurality of parameters may be sent to the server in any manner.

In another embodiment, the plurality of parameters associated with the personal computer may be sent to the server when a user runs an application on the personal computer. In yet another embodiment, the plurality of parameters associated with the personal computer may be sent to the server when a user installs an application on the personal computer. In still another embodiment, the plurality of parameters associated with the personal computer may be sent to the server when a user downloads an application on the personal computer. Of course, however, the plurality of parameters associated with the personal computer may be sent to the server as a result of any action or criteria.

Further, as shown in operation 204, the plurality of parameters is analyzed at the server to determine a monotonic set of presets for the personal computer. In one embodiment, the monotonic set of presets may be determined with respect to one or more software elements installed on the personal computer. For example, the monotonic set of presets may be determined for an instance of an application (e.g., video game software, media playback software, etc.) installed on the personal computer. In another embodiment, the monotonic set of presets may be determined with respect to one or more software elements to be installed on the personal computer (e.g., not yet installed on the computer, etc.).

In yet another embodiment, the monotonic set of presets may represent personal computer settings (both dependent and independent) that impact the way the personal computer runs the one or more software elements. For example, each of the monotonic set of presets may dictate a color depth of displayed graphics provided by the personal computer, a texture mapping level of displayed graphics provided by the personal computer, a texture compression of displayed graphics provided by the personal computer, a lighting model used by the personal computer during the display of graphics, etc.

Further still, in one embodiment, determining the monotonic set of presets may include determining a plurality of performance levels for the personal computer. For example, a plurality of descending performance levels (e.g., from a maximum performance level to a minimum performance level, etc.) may be determined for the personal computer (e.g., utilizing one or more benchmarks, etc.), where each successive performance level indicates that the personal computer performs (e.g., runs, computes, etc.) at a slower rate, less efficiently, or in an otherwise less desirable manner when compared to the previous level. In another embodiment, the performance level may be associated with a level of resources used by the personal computer. For example, the performance level may indicate an amount of processing resources used by the personal computer, an amount of software resources used by the personal computer, an amount of network resources utilized by the personal computer, a frame rate provided by the personal computer, etc.

Also, in one embodiment, determining the monotonic set of presets may include determining a plurality of image quality levels for the personal computer. For example, a plurality of ascending image quality levels (e.g., from a minimum image quality level to a maximum image quality level, etc.) may be determined for the personal computer, where each successive image quality level indicates that the image quality displayed by the personal computer (e.g., one or more of the resolution, color, detail, etc.) increases when compared to the previous level.

In addition, in one embodiment, each of the plurality of performance levels may be associated with one of the plurality of image quality levels for the personal computer. For example, each successively descending performance level may be associated with a successively increasing image quality level, such that as the performance of the personal computer decreases, the image quality produced by the personal computer increases. In another embodiment, the image quality level may be maximized for each of the plurality of performance levels, based on the plurality of parameters of the personal computer.

For example, for each determined performance level, the server may determine a maximum image quality that can be provided by the personal computer based on the plurality of parameters of the personal computer. In one embodiment, the maximum image quality may be calculated utilizing a greedy algorithm. In another embodiment, the maximum image quality may be calculated utilizing an exhaustive algorithm. Of course, however, the maximum image quality for each performance level may be calculated in any manner. In this way, the presets may be monotonically increasing in terms of image quality and monotonically decreasing in terms of performance.

Furthermore, in one embodiment, the maximum image quality may be determined utilizing an analog approach. For example, a plurality of adjustment elements, a "bang-for-buck" indicator, and "fail" indicator may be provided. In another example, each adjustment element may represent one property in the application. In yet another example, each adjustment element may be adjusted in discrete steps. In another embodiment, the "bang-for-buck" indicator may return an overall value (e.g., an image quality times a frame rate) for a present preset. In yet another embodiment, the "fail" indicator may be activated if and only if the preset is invalid. This may be needed if there are dependent variables, and some presets are indeed invalid.

For example, two adjustment elements A and B may have stops False and True, but adjustment element B may only be set to True if and only if adjustment element A is also set to True. In such case, the "fail" indicator may be activated only when adjustment element A is set to False, and adjustment element B is set to True. In another embodiment, it may be assumed that stops are ordered such that adjusting an adjustment element up one stop always results in equal/better image quality, and equal/worse performance.

Further still, a monotonic set determination algorithm may start with all adjustment elements turned all the way down to their minimum levels (i.e., their "minset" values). Now, one adjustment element at a time, each adjustment element is temporarily incrementally turned up exactly one stop to its maximum value (e.g., if the adjustment element is turned all the way to 10 out of 10, it will not turn to 11). If the "fail" indicator doesn't activate, we record the "bang-for-buck" indicator value, before setting that adjustment element back to its original position. Once all adjustment elements have been incrementally turned up, the element which produced the highest "bang-for-buck" indicator value (and was still valid) is permanently adjusted one stop. This process may be repeated in this way until all adjustment elements are at their maximum setting (i.e. their "maxset" values). The sequence of (# Stops—# adjustment elements+1) presets which were chosen may represent optimal monotonic presets.

In this way, a monotonic plurality of presets may be determined, which may range from a lowest setting (e.g., "minset," etc.) to the highest setting (e.g., "maxset," etc.) and which may maximize "bang-for-buck" (e.g., image quality per performance unit, etc.) at every step along the way. In addition, the order of the monotonic plurality of presets may be maintained such that monotonicity of performance and image quality may be guaranteed it parameter enumerants are each ordered in same.

Also, as shown in operation 206, the monotonic set of presets is returned to the personal computer from the server. For example, the monotonic set of presets may be returned to the personal computer via a network, within the personal computer, etc. Additionally, as shown in operation 208, the monotonic set of presets is displayed to a user of the personal computer. In one embodiment, the monotonic set of presets may be displayed to the user after the user runs an application that is associated with the monotonic set of presets on the personal computer.

In another embodiment, the user may be able to select one of the monotonic set of presets in association with the application. For example, the presets may be displayed to the user utilizing one or more sliders, knobs, etc. For instance, a slider or knob may be presented to the user, where one end of the slider or knob indicates the highest level of performance available from the personal computer, and the other end of the slider or knob indicates the highest level of image quality available from the personal computer.

Additionally, in one embodiment, the user may select one of the monotonic presets (e.g., by moving or selecting one or more sliders, knobs, etc.) based on a desired image quality and performance for the associated application. In another embodiment, an optimal preset may be determined from the monotonic list of presets. For example, an algorithm may determine an optimal preset for the application from the monotonic list of presets, based on a particular configuration of the personal computer (e.g., a current configuration of one or more of the parameters associated with the personal computer, etc. In another example, a binary search algorithm may be used to converge on the optimal preset from the monotonic list of presets.

In this way, optimal preset settings for one or more software applications may be determined for a personal computer, based on the specific plurality of parameters provided by the personal computer. Further, image quality may be maximized with respect to performance cost for each of the preset settings.

Figure 3:
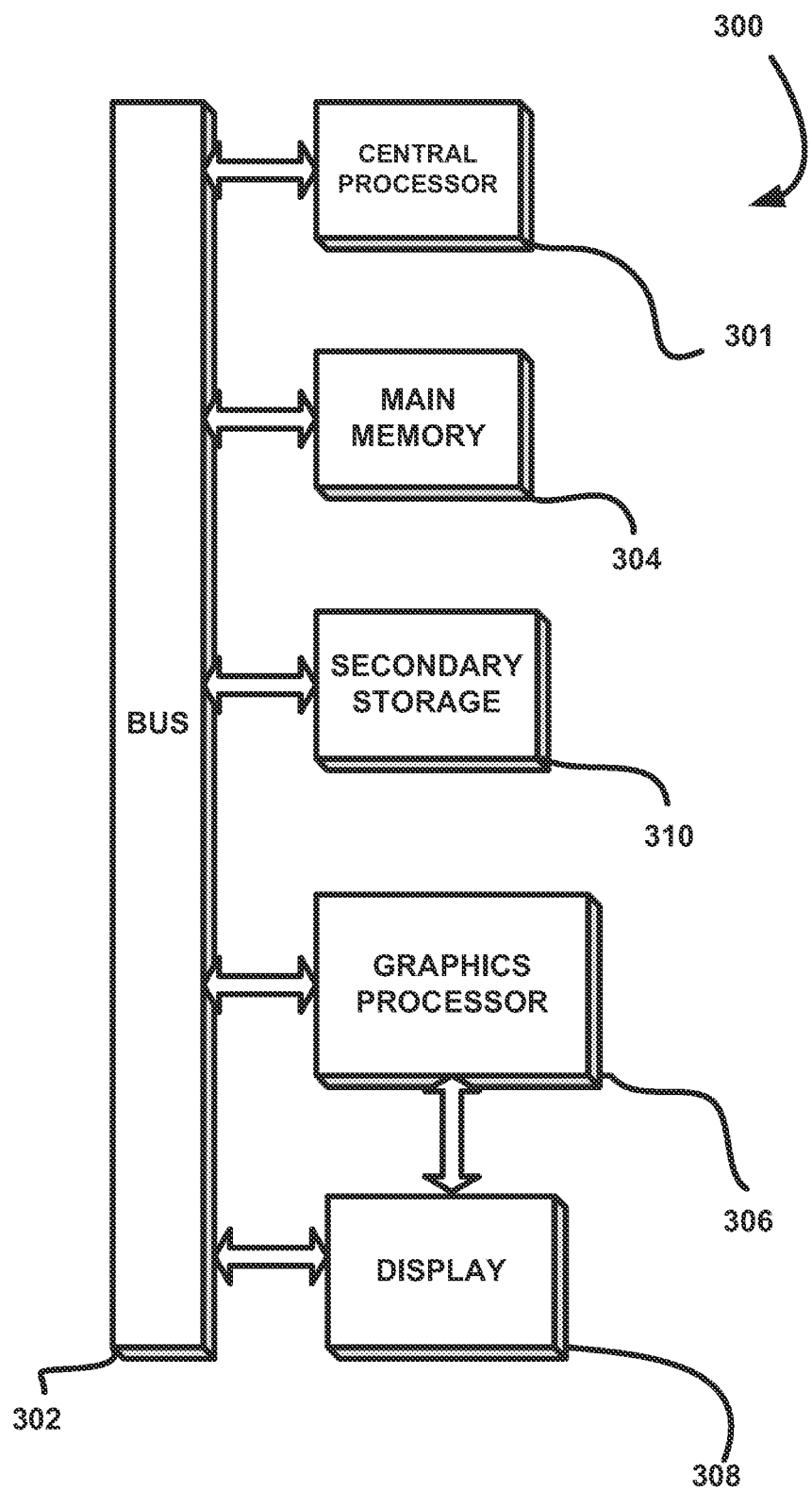
FIG. 3 illustrates an exemplary system in which the various architecture and/or functionality of the various previous embodiments may be implemented.

FIG. 3 illustrates an exemplary system 300 in which the various architecture and/or functionality of the various previous embodiments may be implemented. As shown, a system 300 is provided including at least one host processor 301 which is connected to a communication bus 302. The system 300 also includes a main memory 304. Control logic (software) and data are stored in the main memory 304 which may take the form of random access memory (RAM).

The system 300 also includes a graphics processor 306 and a display 308, i.e. a computer monitor. In one embodiment, the graphics processor 306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 300 may also include a secondary storage 310. The secondary storage 310 includes, for example, a hard disk drive and/or a removable storage drive, representing a floppy disk drive, a magnetic tape drive, a compact disk drive, etc.

The removable storage drive reads from and/or writes to a removable storage unit in a well known manner.

Computer programs, or computer control logic algorithms, may be stored in the main memory 304 and/or the secondary storage 310. Such computer programs, when executed, enable the system 300 to perform various functions. Memory 304, storage 310 and/or any other storage are possible examples of computer-readable media.

In one embodiment, the architecture and/or functionality of the various previous figures may be implemented in the context of the host processor 301, graphics processor 306, an integrated circuit (not shown) that is capable of at least a portion of the capabilities of both the host processor 301 and the graphics processor 306, a chipset a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 300 may take the form of a desktop computer, laptop computer, and/or any other type of logic. Still yet, the system 300 may take the form of various other devices m including, but not limited to a personal digital assistant (PDA) device, a mobile phone device, a television, etc.

Further, while not shown, the system 300 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation, Thus, the breadth and scope of a preferred embodiment should not be limited by any of the above-described exemplary embodiments, but should be defined only in accordance with the following claims and their equivalents.

What is claimed is:

1. A method, comprising:
   receiving at a server from a personal computer separate from the server a plurality of parameters associated with a display of the personal computer; and
   determining, by the server, a monotonic set of presets associated with the personal computer, based on the plurality of parameters, including:
      determining by the server a minimum image quality and associated preset that is provided by the personal computer by adjusting each of the plurality of parameters to their minimum level,
      determining by the server a maximum image quality and associated preset that is provided by the personal computer by incrementally adjusting the plurality of parameters of the personal computer, utilizing a predetermined algorithm,
      calculating by the server a plurality of ascending image quality levels and associated presets from the minimum image quality to the maximum image quality, and
      identifying the monotonic set of presets as the presets associated with the minimum image quality, maximum image quality, and plurality of ascending image quality levels; and
   returning the determined monotonic set of presets to the personal computer from the server.

2. The method of claim 1, wherein the plurality of parameters includes hardware installed within the personal computer.

3. The method of claim 1, wherein the plurality of parameters includes software installed within the personal computer.

4. The method of claim 1, wherein one or more of the plurality of parameters are independently configurable.

5. The method of claim 1, wherein each preset of the monotonic set of presets includes predefined settings for one or more of the plurality of parameters associated with the product or service.

6. The method of claim 1, wherein each preset of the monotonic set of presets includes predefined settings for one or more elements of software installed within the personal computer.

7. The method of claim 1, wherein the monotonic set of presets includes a set of presets that sequentially increases with respect to a first characteristic and sequentially decreases with respect to a second characteristic.

8. The method of claim 7, wherein the second characteristic is associated with performance.

9. The method of claim 1, wherein the predetermined algorithm includes a greedy algorithm or an exhaustive algorithm.

10. The method of claim 1, wherein the plurality of parameters is sent from the personal computer to the server via a network.

11. A computer program product embodied on a non-transitory computer readable medium, comprising code for:
    receiving at a server from a personal computer separate from the server a plurality of parameters associated with a display of the personal computer; and
    determining, by the server, a monotonic set of presets associated with the personal computer, based on the plurality of parameters, including:
       determining by the server a minimum image quality and associated preset that is provided by the personal computer by adjusting each of the plurality of parameters to their minimum level,
       determining by the server a maximum image quality and associated preset that is provided by the personal computer by incrementally adjusting the plurality of parameters of the personal computer, utilizing a predetermined algorithm,
       calculating by the server a plurality of ascending image quality levels and associated presets from the minimum image quality to the maximum image quality, and
       identifying the monotonic set of presets as the presets associated with the minimum image quality, maximum image quality, and plurality of ascending image quality levels; and
    returning the determined monotonic set of presets to the personal computer from the server.

12. A system, comprising:
    a processor for:
    receiving at a server from a personal computer separate from the server a plurality of parameters associated with a display of the personal computer; and
    determining, by the server, a monotonic set of presets associated with the personal computer, based on the plurality of parameters, including:
       determining by the server a minimum image quality and associated preset that is provided by the personal computer by adjusting each of the plurality of parameters to their minimum level, determining by the server a maximum image quality and associated preset that is provided by the personal computer by incrementally adjusting the plurality of parameters of the personal computer, utilizing a predetermined algorithm, calculating by the server a plurality of ascending image quality levels and associated presets from the minimum image quality to the maximum image quality, and identifying the monotonic set of presets as the presets associated with the minimum image quality, maximum image quality, and plurality of ascending image quality levels; and returning the determined monotonic set of presets to the personal computer from the server.

13. The system of claim 12, wherein the processor is coupled to memory via a bus.

* * * * *